Oct. 8, 1957     H. A. HAMBERGER     2,808,743
AUTOMATIC CIRCULAR SAW SHARPENER
Filed March 20, 1956     2 Sheets-Sheet 1
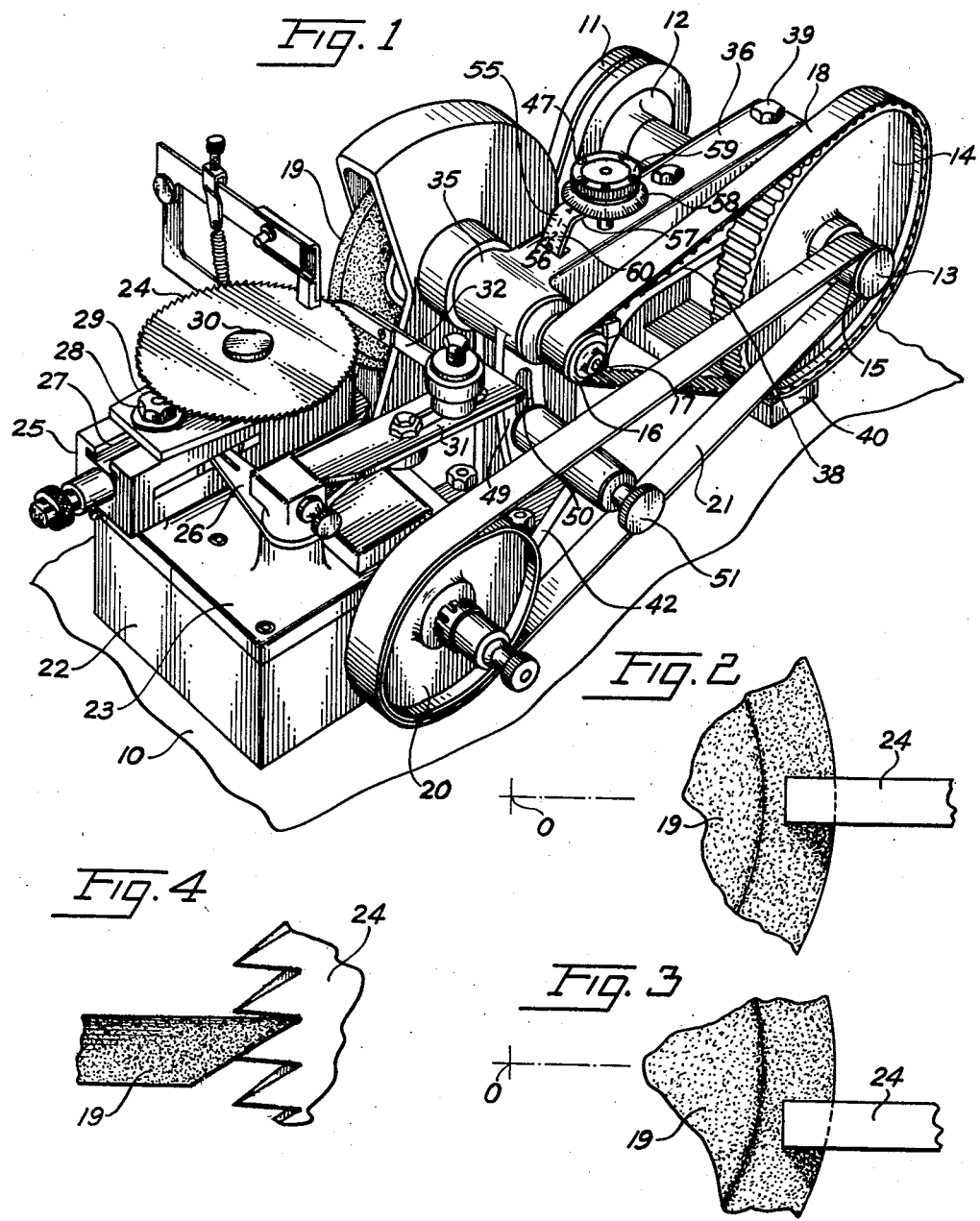
HENRY A. HAMBERGER
INVENTOR.
BY *[signature]*
his AGENT.

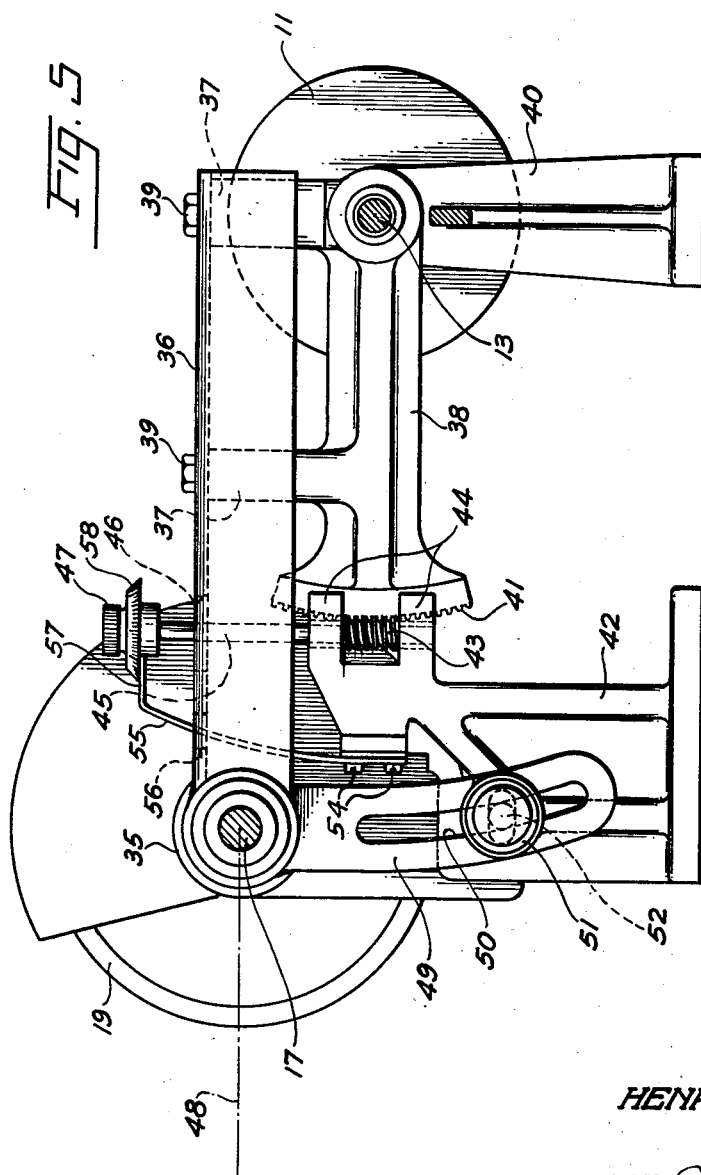

2,808,743

AUTOMATIC CIRCULAR SAW SHARPENER

Henry A. Hamberger, Rochester, N. Y., assignor to Hamco Machines, Incorporated, Rochester, N. Y., a corporation of New York Application March 20, 1956, Serial No. 572,661

6 Claims. (Cl. 76—43)

This invention relates to grinding machines and more particularly to a grinding machine for automatically sharpening the teeth of small circular metal cutting saws.

It is well-known in the art to provide an automatic means for sharpening saw teeth. However, small circular saws which are used for cutting metal, because of their large number of teeth, are extremely difficult to sharpen. Further, in many instances the side of each saw tooth may be bevelled to provide better cutting action. This means that the grinding wheel must be displaced with respect to the saw in order to obtain the required and necessary bevel. In this respect, the invention represents an improvement in the automatic saw sharpener disclosed in my U. S. Patent No. 2,570,118 which was issued October 2, 1951.

By pivotally mounting the grinding wheel in a manner that permits it to be raised or lowered with respect to the saw, a bevel can be obtained which is equivalent to that originally ground on the saw teeth. To grind the teeth of a saw having no bevel surface on the teeth, the grinding wheel is positioned so the axis of rotation thereof lies in the plane passing through the middle of the saw; that is, a plane which is normal to the axis of rotation of the saw. When the grinding wheel is moved in either direction with respect to the saw, by either raising or lowering the grinding wheel, the cutting surface of the wheel is not in the same relation to the saw and causes a bevel to be ground on the side surface of the tooth. By mounting the grinding wheel so that it can be raised or lowered with respect to the saw, it makes no difference how the saw is mounted on the arbor. In other words the bevel may face either up or down and the grinding wheel is then adjusted accordingly.

The primary object of the invention is, therefore, the provision of an automatic grinding machine which is particularly adapted to the grinding and sharpening of the teeth of various sizes of small circular metal cutting saws which have either straight or bevelled-edge teeth.

Another object of the invention is to provide an automatic grinder for circular saws in which the grinding wheel is mounted for movement with respect to the saw in a plane perpendicular thereto whereby straight-edged teeth or teeth having a bevelled surface can be readily ground with a minimum amount of adjusting.

Yet another object of the invention is to provide an automatic grinder for circular saws in which the grinding wheel can be raised or lowered for grinding the required bevel on the saw teeth and which has an indicating means associated therewith whereby the angular and linear relation of the wheel with respect to the saw is denoted.

And yet another object of the invention is to provide an automatic grinder for circular saws in which the grinding wheel can be raised or lowered with respect to the saw and locked in its adjusted position without any adjustment of the drive therefor being necessary.

Other objects and advantages of the invention will be apparent to those skilled in the art by the description which follows.

Reference is now made to the accompanying drawings wherein like reference numerals designate like parts and wherein:

Fig. 1 is a perspective view of the grinding machine and showing the complete mechanism;

Fig. 2 is a diagrammatic view showing the relation of the grinding wheel to the saw when teeth having straight edges are to be ground;

Fig. 3 is a diagrammatic view similar to Fig. 2 in which the grinding wheel has been raised with respect to the saw;

Fig. 4 is a diagrammatic plan view of the grinding wheel and saw, as shown in Fig. 3, and showing the bevel edge on the saw teeth; and Fig. 5 is a side elevation of the grinding wheel and the supporting members therefor and showing the relation of the indicating means and the locking means.

In the illustrated embodiment of the invention the mechanism is mounted on a plate 10 which can be a bed plate or a plate on a frame depending on whether the saw grinder is utilized on a bench or on the floor. A motor, not shown, by means of belt 11 drives pulley 12 and, hence, the shaft 13 and the pulleys 14 and 15 fixed or keyed thereto. Pulley 14 drives pulley 16 on shaft 17 by means of timing belt 18. At the opposite end of shaft 17, grinding wheel 19 is mounted thereon and is, therefore, rotated by belt 18. Pulley 13 drives pulley 20 by means of belt 21, pulley 20 driving a shaft which extends into mechanism box 22 having a cover plate 23.

The support means for saw 24 comprises a block 25 having ways which engage corresponding ways on cover 23, block 25 being moved along said ways by arm 26 for moving the saw into and out of engagement with grinding wheel 19. Block 25 is provided with a T-slot 27 for securing holder 29 thereto by means of bolt 28. The holder 29 receives the pin or arbor 30 by means of which saw 24 is mounted on said holder. The mechanism within box 22 also oscillates arm 31 and arm 32 which extends therefrom thereby intermittently rotating saw 24 by engaging the successive teeth on the periphery thereof. The mechanism within box 22 oscillates arms 26 and 31 simultaneously with the result that, as saw 24 is moved away from grinding wheel 19 by arm 26, arms 31 and 32 rotate saw 24 by an amount equivalent to one or more teeth to position the next tooth to be ground in proper relation to the grinding wheel when the motion of block 25 is reversed and saw 24 is then moved toward wheel 19. A full description of this mechanism and the means for adjusting the movement of block 25 and arms 26 and 31 can be had by reference to my above noted patent.

In order to provide either a straight or bevel cutting edge on the teeth of saw 24, shaft 17 on which grinding wheel 19 is mounted is journaled in the bearing member 35 carried on one end of carrier 36, see Fig. 5. Carrier 36 is U-shaped in cross section and is secured to lugs 37 on member 38 by bolts 39. Shaft 13 is journaled in bracket 40 which is provided with spaced bearings and secured to plate 10. Member 38 is supported between the spaced bearings by shaft 13 and has a worm gear sector 41 formed on the opposite end thereof. Since carrier 36 is secured to member 38, the two elements pivot as a single member about shaft 13. A second bracket 42 is mounted on plate 10 and has a worm 43 journaled between two extending bearing lugs 44, the worm engaging sector 41 and having a shaft 45 which extends vertically through an elongated slot 46 in carrier 36 and which has the graduated knob 47 fixed thereto. From the structure described so far, it is evident that rotation of knob 47 will cause sector 41 to be raised or lowered, depending on the direction of rotation, and such movement will result in grinding wheel 19 being raised or lowered with respect to the mid-plane of the saw, as designated by line 48 in Fig. 5 which normally passes through the center of rotation of grinding wheel 19 for on-center grinding.

Depending from bearing member 35 are two spaced arcuate arms 49 having elongated arcuate slots 50. Arcuate arms 49 straddle a portion of bracket 42 which carries locking means 51. The locking means can be any type of device which will clamp arcuate arms 49 to bracket 42 for maintaining grinding wheel 19 in any position with respect to line 48. Such a locking device is preferably of a type in which pin 52, which passes through slots 50, is spring biased to obtain a maximum locking effect due to grinding wheel 19 being mounted in a cantilever manner.

Attached to bracket 42 by screws 54 is an arcuate scale member 55 which extends through slot 56 in carrier 36 and has a portion 57 which lies under knob 47. Scale member 55 is provided with a scale 60 denoting the angular position of grinding wheel 19 with respect to its normal position. Knob 47 is also provided with a scale 58 and 59 which together denote the vertical linear distance between the supporting surface on block 25 for saw 24 and the center of rotation of grinding wheel 19.

Normally, grinding wheel 19 is positioned so the plane of the mounting surface on block member 35 for saw 24 passes through the center of said wheel. When a saw is to be sharpened, its thickness must first be determined and knob 47 is then rotated to raise said wheel until scales 58 and 59 thereon, which denote thousandths of an inch, indicate one-half of this amount. This adjustment places grinding wheel 19 in on-center relation to the saw. The angular movement or relation of said wheel by knob 47 is also indicated on scale 60. By observing these scale readings, the operator can return grinding wheel 19 on its on-center position whether the grinding wheel is raised or lowered with respect to this position to obtain the necessary and required bevel on the face of each tooth.

In the grinding of saw teeth, the type of wheel usually used is one having straight and angular cutting surfaces. The angular relation of the cutting surface of the wheel used is generally determined by the form of the teeth on the saw being sharpened. In Figs. 2–4, each tooth of saw 24 is assumed to have an angular cutting edge and a substantially radial edge and for such teeth a grinding wheel of the type shown in Fig. 4 is used. If such teeth do not have a bevel, the center O of the grinding wheel 19 is positioned so it is located in the plane which passes centrally through the saw 24, as shown in Fig. 2. This location of grinding wheel 19 results in the faces of each tooth being ground square or perpendicular to the faces of the saw. If the teeth of saw 24 are to have a bevel or angular surface with respect to one of the faces of saw 24, as shown in Fig. 4, then grinding wheel 19 must be raised or lowered depending on the direction of the bevel and its relation to the grinding wheel when the saw is placed on arbor 30. The center O of grinding wheel 19 then assumes a position, for example, as shown in Fig. 3, above saw 24. This displacement results in a bevel being ground on the one face of each tooth. If the teeth of a saw have oppositely inclined bevel surfaces, alternate teeth are first ground with the saw in a raised position and then the wheel is moved to a position in which the center O is an equivalent distance below the saw and the other teeth are then ground. This is accomplished by adjusting the throw of arms 26, 31 and 32 as described in my patent to index saw 24 by an amount equivalent to two teeth instead of one.

From the foregoing description, it is evident that the pivotal mounting of grinding wheel 19 provides a simple and efficient structure which permits the machine to be readily adapted to the grinding of various types of saw teeth. Further by providing means for indicating the position of the grinding wheel center with respect to the saw, accurate realignment of the wheel for on-center contact for straight-face tooth grinding is assured.

Since other modifications of the invention are possible, the embodiment of the invention described above is deemed to be merely illustrative, and the scope of the invention is defined by the appended claims.

Having now particularly described my invention, what I desire to secure by Letters Patent of the United States and what I claim is:

1. In a machine for grinding circular saw teeth, the combination comprising a grinding wheel, driving means operatively connected to said grinding wheel for imparting rotation thereto, a support means for maintaining said saw in a plane perpendicular to the plane of said grinding wheel, a support member, an extending member pivotally mounted at one end of said support member and having a worm gear sector formed on the other end thereof, a carrier member fixed to said extending member for movement therewith and projecting beyond said gear sector, said projecting end being provided with a bearing for rotatably supporting said grinding wheel, a second support member adjacent said grinding wheel, and a worm rotatably mounted on said second support member and operatively engaging said worm gear sector for moving said extending member to vary the position of said grinding wheel with respect to said saw in accordance with the required bevel for said saw teeth.

2. In a machine for automatically grinding circular saw teeth, the combination comprising a grinding wheel, driving means operatively connected to said grinding wheel for imparting rotation thereto, a support means for maintaining said saw in a plane perpendicular to the plane of said grinding wheel, a support member, an extending member pivotally mounted at one end on said support member and having a worm gear sector formed on the other end thereof, a carrier member fixed to said extending member for movement therewith and projecting beyond said worm gear sector, said projecting end being provided with a bearing for rotatably supporting said grinding wheel, a second support member adjacent said grinding wheel, a worm rotatably mounted on said second support member and operatively engaging said worm gear sector for moving said extending member to vary the position of said grinding wheel with respect to said saw in accordance with the required bevel for said saw teeth, indexing means for engaging the teeth of said saw, and an actuating means operatively connected to said drive means for simultaneously imparting a reciprocating motion to said support means for moving said saw into and out of engagement with said grinding wheel and an oscillating motion to said indexing means for intermittently rotating said saw.

3. In a machine for grinding circular saw teeth, the combination comprising a grinding wheel, driving means operatively connected to said grinding wheel for imparting rotation thereto, a support means for maintaining said saw in a plane perpendicular to the plane of said grinding wheel, a support member, an extending member pivotally mounted at one end on said support member and having a worm gear sector formed on the other end thereof, a carrier member fixed to said extending member for movement therewith and projecting beyond said gear sector, said projecting end being provided with a bearing for rotatably supporting said grinding wheel and having spaced arcuate extensions dependent from said bearing, a second support member adjacent said grinding wheel, a worm rotatably mounted on said second support member and operatively engaging said worm gear sector for moving said extending member to vary the position of said grinding wheel from its normal position in which the axis of rotation of said grinding wheel lies in the mid-plane of said saw to a position in accordance with the required bevel for said saw teeth, and means mounted on said second support member and engaging said arcuate extensions for maintaining said grinding wheel in said position with respect to said saw.

4. In a machine for grinding circular saw teeth, the combination comprising a grinding wheel, driving means operatively connected to said grinding wheel for imparting rotation thereto, a support means for maintaining said saw in a plane perpendicular to the plane of said grinding wheel, a support member, an extending member pivotally mounted at one end on said support member and having a worm gear sector formed on the other end thereof, a carrier member fixed to said extending member for movement therewith and projecting beyond said gear sector, said projecting end being provided with a bearing for rotatably supporting said grinding wheel and having spaced arcuate extensions dependent from said bearing, a second support member adjacent said grinding wheel, a worm rotatably mounted on said second support member and operatively engaging said worm gear sector for moving said extending member to vary the position of said grinding wheel from its normal position in which the axis of rotation of said grinding wheel lies in the plane of said saw in accordance with the required bevel for said saw teeth, and means for indicating the angular and linear position of said grinding wheel with respect to its normal position and said saw.

5. In a machine for grinding circular saw teeth, the combination comprising a grinding wheel, driving means operatively connected to said grinding wheel for imparting rotation thereto, a support means for maintaining said saw in a plane perpendicular to the plane of said grinding wheel, a support member, an extending member pivotally mounted at one end on said support member and having a worm gear sector formed on the other end thereof, a carrier member fixed to said extending member for movement therewith and projecting beyond said gear sector, said projecting end being provided with a bearing for rotatably supporting said grinding wheel and having spaced arcuate extensions dependent from said bearing, a second support member adjacent said grinding wheel, a worm rotatably mounted on said second support member and operatively engaging said worm gear sector for moving said extending member to vary the position of said grinding wheel from its normal position in which the axis of rotation of said grinding wheel lies in the plane of said saw to a position in accordance with the required bevel for said saw teeth, means mounted on said second support member and engaging said arcuate extensions for retaining said grinding wheel in said position with respect to said saw, and means for indicating the angular and linear position of said grinding wheel with respect to its normal position and said saw.

6. In a machine for automatically grinding circular saw teeth, the combination comprising a grinding wheel, driving means operatively connected to said grinding wheel for imparting rotation thereto, a support means for maintaining said saw in a plane perpendicular to the plane of said grinding wheel, a support member, an extending member pivotally mounted at one end on said support member and having a worm gear sector formed on the other end thereof, a carrier member fixed to said extending member for movement therewith and projecting beyond said gear sector, said projecting end being provided with a bearing for rotatably supporting said grinding wheel and having spaced arcuate extensions dependent from said bearing, a second support member adjacent said grinding wheel, a worm rotatably mounted on said second support member and operatively engaging said worm gear for moving said extending member to vary the position of said grinding wheel from its normal position in which the axis of rotation of said grinding wheel lies in the plane of said saw to a position in accordance with the required bevel for said saw teeth, means mounted on said second support member and engaging said arcuate extensions for retaining said grinding wheel in said position with respect to said saw, means for indicating the angular and linear position of said grinding wheel with respect to its normal position and said saw, an indexing means for engaging the teeth of said saw, and an actuating means operatively connected to said drive means for simultaneously imparting a reciprocating motion to said support means for moving said saw into and out of engagement with said grinding wheel and an oscillating motion to said indexing means for intermittently rotating said saw.

References Cited in the file of this patent

UNITED STATES PATENTS

| | | |
|---|---|---|
| 21,729 | Wolfe | Oct. 5, 1858 |
| 2,293,231 | Weiland | Aug. 18, 1942 |
| 2,570,118 | Hamberger | Oct. 2, 1951 |